Patented May 17, 1932

1,859,250

UNITED STATES PATENT OFFICE

RUDOLF BERTEL, OF VIENNA, AUSTRIA

MANUFACTURE OF DRY YEAST

No Drawing. Application filed September 11, 1930, Serial No. 481,341, and in Austria October 4, 1929.

This invention relates to the manufacture of dry yeast. An object of the invention is to produce a dry yeast preparation for use in baking, in the manufacture of new wine, fruit wine, berry wine, malt wine, etc. Another object is to preserve pure cultures of wine yeast. Other objects will hereinafter appear.

The process according to this invention consists in admixing separated yeast with readily soluble salts in solid state, which salts are capable of acting as nourishing salts or stimulants, or of exerting both actions, and then drying the mixture. Such admixtures are advantageously readily soluble salts of lactic acid, phosphoric acid or mixtures of these salts.

For carrying out the process according to this invention, the yeast separated in the usual way from the nutrient medium is incorporated for instance with calcium lactate or a mixture of calcium lactate and primary calcium phosphate so as to form a mass showing a friable structure. In this state the yeast will dry very easily on hurdlework in a current of air having a temperature of 30–35° C., the rapid progress of the drying being of importance for the preservation of the vital functions of the yeast. The salts added to the yeast furthermore exert a preserving action and stimulate the yeast in the very best manner when later set on for fermentation.

With the same effect there may be used calcium lacto-phosphoricum (double salt of calcium lactate and primary calcium phosphate), by incorporating it in the dry (powdery) state with the yeast just separated by centrifuging or pressing, and rapidly drying this mixture at a lower temperature (e. g. at 35° C.).

Drying may of course also be effected in vacuo.

In order to obtain the best results it is important to start with a well matured yeast. A yeast particularly suitable as starting material for the present process is obtained, if the yeast is aerated immediately before separating in the nutrient medium in which it has grown or in a fresh nutrient solution or in water, the aeration being effected for a relatively long time, e. g. for 48 hours. It is known that the oxydase is invigorated by such a treatment and the plasma albumen of the yeast is much increased whereby the degree of maturation most favorable for the drying process is brought about.

The dry yeast preparations obtained according to the invention retain their full fermenting power without change for several months. They are therefore capable of being transported over long distances. When set on for fermentation at a temperature of say 35° C., they will within a few hours provoke an energetic fermentation independently of climate and weather.

If the resulting dry yeast is to be employed for therapeutical preparations, salts having a therapeutic action may be used as additions.

What I claim is:

1. A process for manufacturing dry yeast which process consists in mixing separated yeast with readily soluble solid calcium salts of lactic acid and drying the mass thus obtained.

2. A process for manufacturing dry yeast which process consists in mixing separated yeast with readily soluble solid calcium salts of lactic acid and in addition thereto with readily soluble solid calcium phosphates and drying the mixture.

3. In the process for manufacturing dry yeast the steps which comprise incorporating separated yeast with a mixture of calcium lactate and primary phosphate in solid state, and drying the mixture.

4. In the process for manufacturing dry yeast the steps which comprise incorporating separated yeast with a mixture of calcium lactate and primary phosphate in solid state, and drying the mixture in a current of air having a temperature below 35° C.

5. Process for the manufacture of dry yeast which consists in mixing separated yeast with a mixture of calcium lactate and primary phosphate in solid state, working up the mixture until a mass of friable structure is obtained, and then drying this mass in a current of air having a temperature below 35° C.

6. Dry yeast preparations containing living yeast and a mixture of calcium lactate and primary calcium phosphate.

7. A dry yeast preparation containing living yeast and readily soluble calcium salts of lactic acid.

In testimony whereof I have affixed my signature.

RUDOLF BERTEL.